United States Patent
Sagar et al.

(10) Patent No.: US 10,548,021 B2
(45) Date of Patent: Jan. 28, 2020

(54) SYSTEMS AND METHODS FOR WIRELESS SPECTRUM ACCESS IN HETEROGENEOUS NETWORKS

(71) Applicant: MISRAM LLC, Holmdel, NJ (US)

(72) Inventors: Vidya Sagar, Matawan, NJ (US); Rajarathnam Chandramouli, Holmdel, NJ (US); Koduvayur P. Subbalakshmi, Holmdel, NJ (US)

(73) Assignee: MISRAM LLC, Holmdel, NJ (US)

( * ) Notice: Subject to any disclaimer, the term of this patent is extended or adjusted under 35 U.S.C. 154(b) by 0 days.

(21) Appl. No.: 15/985,682

(22) Filed: May 21, 2018

(65) Prior Publication Data

US 2018/0338247 A1    Nov. 22, 2018

Related U.S. Application Data

(60) Provisional application No. 62/509,005, filed on May 19, 2017.

(51) Int. Cl.
| | |
|---|---|
| H04W 4/00 | (2018.01) |
| H04W 16/14 | (2009.01) |
| H04W 72/04 | (2009.01) |
| H04W 88/16 | (2009.01) |

(52) U.S. Cl.
CPC ......... *H04W 16/14* (2013.01); *H04W 72/042* (2013.01); *H04W 88/16* (2013.01)

(58) Field of Classification Search
CPC ... H04W 16/14; H04W 88/16; H04W 72/042; H04W 72/04
See application file for complete search history.

(56) References Cited

PUBLICATIONS

"Software Defined Access for HetNets", Jan. 2016.*
Vidya Sagar et al., Software Defined Access for HetNets; Software Defined Radio: 20 Years Later; IEEE Communications Magazine; Jan. 2016; pp. 1-6.

\* cited by examiner

*Primary Examiner* — Abdelillah Elmejjarmi
(74) *Attorney, Agent, or Firm* — Perkins Coie, LLP.

(57) ABSTRACT

Various embodiments of systems, architecture, and/or methods are described for negotiating accesses to wireless spectrum of heterogeneous networks (e.g., Wifi, cellular 3G, cellular LTE, cellular 5G etc.) among multiple users, service providers, and services. As such, a software defined architecture is disclosed. In some embodiments, the disclosed software defined architecture can include establishing a (dedicated) logical control path from a central controller remotely located from an end device of a user. Such a logical control path is agnostic to the type and/or number of underlying wireless networks and is supplemental to conventionally known data paths, i.e., paths for exchanging data.

18 Claims, 12 Drawing Sheets

```
1: procedure RANDOMIZEDWRR(TxQ, weight)
2:     rnd ← random()
3:     if $\frac{\sum_0^i weight}{\sum_0^N weight}$ > rnd then
4:         return i
5:     end if
6: end procedure
7: procedure TXAGGREGATE(TxQ, weight)

8:     if $len(TxQ[max_q]) \leq L_{thresh}$ then
9:         return RandomizedWRR(TxQ, weight)
10:    else
11:        if $len(TxQ[min_q]) \leq L_{thresh}$ then
12:            returnTransmit(TxQ[min_q])
13:        end if
14:    end if
15:    if $len(TxQ[min_q]) \geq U_{thresh}$ then
16:        for all index ∈ TxQueue do
17:            weight[index] ← $\lfloor \frac{\partial len(TxQ[index])}{\partial t} \rfloor$
18:        end for
19:        return RandomizedWRR(TxQ, weight)
20:    end if
21:    returnTransmit(TxQ[min_q])
22: end procedure
```

*FIG. 3B*

SYSTEMS AND METHODS FOR WIRELESS SPECTRUM ACCESS IN HETEROGENEOUS NETWORKS

CROSS-REFERENCE TO RELATED APPLICATIONS

The present application claims the benefit of U.S. patent application 62/509,005 filed May 19, 2017, the disclosure of which is hereby incorporated by reference in its entirety.

FIELD OF THE DISCLOSURE

The present disclosure generally relates to systems and methods that manage and control how accesses to wireless spectrum can be shared, and more particularly to the use of software-defined architectures for optimizing parameters associated with determining how wireless spectrum accesses can be shared among users, applications, and service providers.

BACKGROUND

Within the radio spectrum there are several radio frequency bands. Some bands, known as unlicensed bands or unlicensed spectrum, are unrestricted and available for wireless communications service providers to use. Alternatively, licensed links bands are allocated selectively and require regulatory (e.g., Federal Communications Commission (FCC) approval before service providers are able to utilize these bands. Continually increasing mobile data traffic from users is leading to growing demands on network capacity. This situation is made even more difficult because different applications have different bandwidth/network requirements. For example, an application for document processing is much less bandwidth-intensive than a streaming video application.

Additional network capacity can be obtained by increasing spectral efficiency or by acquiring additional wireless spectrum. Spectral efficiency in 4G systems for single input single output communication (SISO) has reached theoretical limits of communication. Using multiple antennas at base stations (access points) and/or at the mobile devices can provide some spectral gain. While transmission diversity is currently used at some base stations, receiver diversity can be difficult due to constraints on the form factor of mobile devices. Further, regulatory concerns and limited availability of licensed bands have resulted acquiring additional wireless spectrum a particularly challenging task. Because it is difficult to acquire additional wireless spectrum, licensed band technologies (such as LTE, 5G, etc.) are increasingly relying upon unlicensed bands for additional spectrum. Further, a large number of independent service providers utilizing a variety of underlying wireless technologies (e.g., 3G, Wifi, LTE, 5G etc.) makes this even more challenging. Thus, there exists a need for a new system perspective that can help in determining how wireless spectrum accesses can be shared among users, applications, and service providers.

BRIEF DESCRIPTION OF DRAWINGS

FIG. 3B illustrates an exemplary bandwidth aggregation process that can be used in embodiments of the disclosed SDA system.

DETAILED DESCRIPTION

Figure 1:
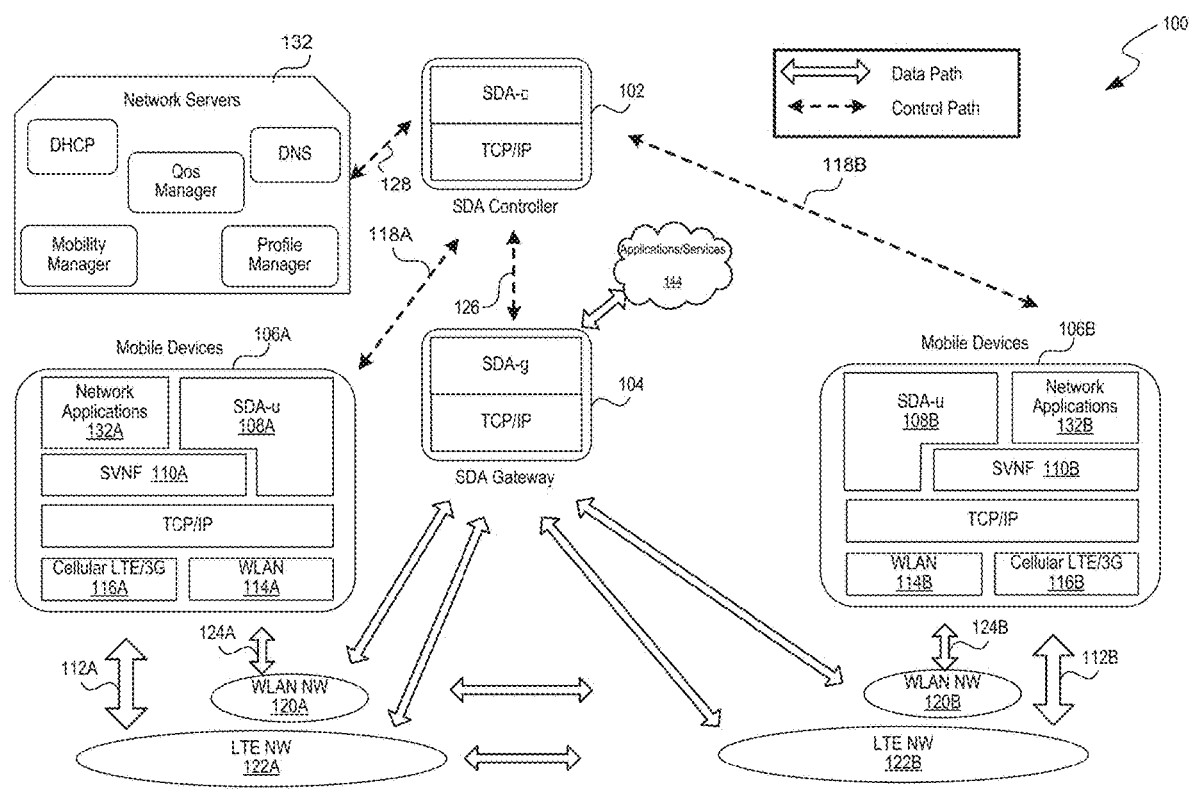
FIG. 1 illustrates an overview of a representative system showing various components of the disclosed software defined architecture (SDA).

Embodiments disclosed herein relate to wireless networks employing software defined architecture (SDA) that allow different types of wireless communication technologies (e.g., LTE, Wifi, 3G, 5G, etc.) to co-operate/collaborate/interwork with one another. For example, customers of a cellular service provider can seamlessly use a Wifi network without additional subscription cost. (As used herein, the term "Wifi network" or WLAN has broader applicability in that it could refer to an Internet service provider or a user subscribing to an Internet service provider. Furthermore, the user could refer to an individual user or a business entity.) A centralized controller, as disclosed herein, facilitates or otherwise manages accesses to the Wifi network by the cellular service provider. In some embodiments, the controller also provides the cellular service provider the option to control various Wifi network parameters (e.g., transmitting frequency, power, RTS/CTS, preamble length and others). The controller thus operates as an auctioneer to facilitate access and usage of the Wifi network (a/k/a the licensor in the above example) by the cellular service provider (a/k/a the licensee in the above example).

As another example, the disclosed controller can facilitate spectrum access and usage of a cellular service provider's network by a Wifi network.

As yet another example, the disclosed controller can facilitate spectrum access and usage of a first cellular service provider's network by a second cellular service provider.

It will be understood from all of the above examples that this type of interoperability (for data traffic communications) between different service providers or different types of networks is based on some form of coordination. Coordination in prior art systems requires common network infrastructure or changes in network infrastructure to accommodate another operator's network. This limits operators from offering the features discussed herein. Additionally, current architectures are not able to offload data traffic back to the original network (i.e., "reverse offload"), once offloaded away from the original operator's network. This implies bouncing back to Wifi after being offloaded to a cellular network, or vice versa. The inability to reverse offload also discourages inter-operator cooperation or coordination. The terms "offload" and "reverse offload" can be respectively synonymous with the terms "offload in" and "offload out."

The above examples illustrate an advantageous aspect—accesses to the wireless spectrum associated with different wireless networks (e.g., LTE, Wifi, 3G, 5G, etc.) can be shared by users, service providers (e.g., Verizon, AT&T, Comcast, Optimum Wifi), and applications (e.g., Hulu, Youtube, Facebook, etc.). This paradigm of sharing spectrum accesses introduces the notion that "spectrum accesses" can be regarded as a commodity for sharing, selling, buying, advertising, or licensing. The term "wireless spectrum," as used herein, can refer to unlicensed spectrum, licensed spectrum, or both.

In some embodiments, the disclosed architecture for sharing spectrum accesses can include establishing a (dedicated) logical control path from a remotely-located central controller to an end device of a user. Such a logical control path is supplemental to conventionally known data paths, i.e., paths for exchanging data. A logical control path, as disclosed herein, connects an end user device to a remote controller and is agnostic to the underlying wireless network(s). That is, the logical control path is established irrespective of whether the underlying wireless network is Wifi, cellular 3G, cellular LTE, WiMax, wireless mesh network, or any combination of the above networks and regardless of a service provider of the network. Further, the logical control path between a mobile device and a SDA-c is connected as long as any of its interfaces (wifi or cellular) stays connected. Thus, advantageously, the logical control path is not bound or otherwise tied to a network provider or type of a wireless network. The logical control path can carry control information (e.g., requests/responses) and operational settings of the mobile device. Operational settings can be user preferences, such use public wifi, not use free wifi, use battery saving mode etc. Further, in accordance with disclosed embodiments, there is no requirement of any specialized mobile devices or coordination between/among service providers. Yet further, there is no limitation on the type of applications or services that end user devices are able to access. The controller can act as a broker to negotiate spectrum accesses among different parties such as users, service providers, and applications. Various advantages of the disclosed technology will be better understood in the discussions that follow.

FIG. 1 illustrates an overview of a representative system 100 showing various components of the disclosed software defined architecture (SDA). System 100 includes an SDA-Controller ("SDA-c") 102 connected to a plurality of mobile devices 106A, 106B via an SDA-Gateway ("SDA-g") 104 and logical control paths 118A, 118B. Logical control paths 118A, 118B are configured to span across interfaces of multiple wireless networks and terminate at mobile devices 106A, 106B. For example, in FIG. 1, logical control path 118A spans across WLAN 120A and LTE network 122A. One advantage of the disclosed technology is that unlike conventional systems, system 100 is agnostic to the underlying wireless networks and the service providers/operators involved with such networks. With reference to FIG. 1, this implies that system 100 can be easily deployed, and does not require changing network elements of WLAN 120A and/or LTE network 122A, or even that of mobile devices 106A, 106B. Non-limiting examples of mobile devices 106A, 106B can be a mobile phone, a laptop, a tablet computer, an Internet of things (IoT) device, a wearable computing device, or generally user equipment (UE) of any type, brand, or manufacturer.

Mobile devices 106A, 106B communicably exchange data with SDA-c 102 via wireless interfaces and data paths associated with a wireless network. For example, cellular LTE interface 116A communicates with LTE network 122A over cellular LTE data path 112A, and WLAN interface 114A communicates with WLAN 120A over WLAN data path 124A. In some embodiments, logical control path 118A allows SDA-c 102 to maintain, regulate and configure data paths 112A, 124A for mobile device 106A. Logical control path 118B allows SDA-c 102 to regulate and configure data paths 112B, 124B for mobile device 106B.

FIG. 1 shows each mobile device (e.g., mobile device 106A) includes one or more userspace client programs (e.g., SDA-u 108A), a virtual network function (e.g., SVNF 110A), and one or more network applications (e.g., network application 132A). One or more network applications 132A (e.g., Youtube, HULU, Facebook, etc.) running on mobile device 106A can be configured to run on wireless networks such as WLAN 120A or LTE network 122A. Clients SDA-u 108A, SDA-u 108B running on mobile devices 106A, 106B can be used for authenticating mobile devices 106A, 106B with SDA-c 102. Clients SDA-u 108A, SDA-u 108B can also update SDA-c 102 with user configuration information and user preferences associated with network applications 132A, 132B. Clients SDA-u 108A, SDA-u 108B comply with routing policies provided by SDA-c 102. In some embodiments, a SVNF such as SVNF 110A can be a function or a system utility program that provides a virtual network interface to network applications 132A running on mobile device 106A. Accordingly, SVNFs 110A, 110B thus operate as bidirectional conduits between network applications 132A, 132B and their respective utility programs 108A, 108B. In some embodiments, SVNFs 110A, 110B are assigned wireless network-independent IP addresses by SDA-c 102. Thus, for example, the IP address assigned to SVNF 110A is independent of whether mobile device 106A utilizes LTE network 122A or WLAN 120A for communications. Since the IP address of SVNF 110A is not tied to a particular type of underlying wireless access technology, network applications 132A are able to maintain their own existence (e.g., sockets provided by operating systems such as Unix/Linux, Windows) during handover from one wireless network to another (e.g., LTE to Wifi). The IP address of SVNF 110A also does not change due to loss of coverage/failure of a wireless network.

In some embodiments, for exchanging data via data paths, SDA system relies on subflows. Thus, a SDA-u (e.g., SDA-u 108A) can split various outgoing flows (e.g., associated with data paths 112A, 124A) into network-specific subflows, e.g., subflows specific to LTE network 122A and WLAN 120A. SDA-u 108A can also retrieve incoming flows from network-specific subflows. As an example, a first collection of subflows on data path 112A can be associated with LTE network 122A, whereas a second collection of subflows on data path 124A can be associated with WLAN 120A.

SDA-u 108A, SDA-u 108B, and SDA-g 104 disseminate outgoing data over these subflows and recover data from incoming subflows. SDA-u 108A, SDA-u 108B, and SDA-g 104 comply with routing policies governed by SDA-c 102. The data paths of system 100 carry packets through a wireless network. System 100 can also classify packets on a per flow basis, which helps in enforcing routing policies on a per-flow basis. Flow-specific routing policies provide SDA system 100 with flow mobility (e.g., the option to offload to another wireless network or networks, or to use multiple wireless networks for a flow, etc.), In some embodiments, SDA-c 102 can use northbound interface ("NBI") to inter-work with controllers on other software defined networks.

For a logical control path, in some embodiments, the disclosed technology utilizes logical flows via the "best" wireless network. Logical flow(s) can be initiated by SDA-c 102 during the registration process. For example, SDA-c 102 can assign a local port number and a connection identifier to SDA-u 108A. SDA-u 108A opens a user datagram protocol ("UDP") socket bound to localhost and communicates with SDA-c 102 on the assigned UDP port with the connection identifier. SDA-c 102 sends an acknowledgement to SDA-u 108A. This handshake process establishes control path 118A between SDA-c 102 and SDA-u 108A. When the mobile device 106A is protected by network access translation (NAT), this handshake allows SDA-c 102 to learn the public IP address of mobile device 106A. A similar handshake process can be followed between SDA-g 104 and SDA-u 108A to establish a logical control path. Although these control path handshakes can happen over the first available or primary wireless network on which SDA-u 108A authenticates with SDA-c 102, logical control path 118A remains independent of the underlying wireless network. Every subsequent (e.g., post handshake) communication over logical control path 118A selects the best wireless network based upon the highest reliability or the lowest delay. Whenever a new wireless network is added to system 100, SDA-c 102 restarts the control path handshake. This helps SDA-c 102 to maintain a list of public IP addresses linked to SDA-u 108A. Additionally, for logical control path 118A, the communication process includes SDA-c 102 assigning the destination address of SDA-u 108A for downlink communication and the source address of SDA-u 108A for uplink communication. To provide reliable control communications, all control messages on logical control path 118A are acknowledged.

SDA-c 102 is the central controller of SDA system 100. SDA-c 102 authenticates mobile devices 106A, 106B and configures various network services in accordance with the profile and preferences provided by clients SDA-u 108A, SDA-u 108B. SDA-c also configures SDA-g 104 for adding or removing subflows and monitors statistics from SDA-g 104 on data paths 112A, 124A, 112B, 124B respectively from SDA-u 108A, SDA-u 108B. Thus, SDA-c 102 may establish different data subflows between a SDA-u (e.g., SDA-u 108A) and SDA-g 104. Other functions of SDA-c 102 can include configuring subflows to provide redundancy for improved reliability to the original flow, and introducing content-aware and/or context-aware traffic policies. One example of a traffic policy can be aggregation of bandwidth from one or more wireless networks. Another example of a traffic policy can be offloading data traffic from one wireless network to another. SDA-c 102 can also detect impairments such as congestion, interference based on monitoring data paths 112A, 124A, 112B, 124B using measurement reports (e.g., signal strength on uplink/downlink) from SDA-u 108A, SDA-u 108B, and SDA-g 104.

SDA-g 104 works as a gateway server for SDA 100 and in some embodiments can perform functions similar to clients SDA-u 108A, SDA-u 108B for data path(s) associated with SDA-g 104. For example, SDA-g 104 communicates data traffic information associated with one or more remote applications and services 144 via WLAN or LTE networks. SDA-g 104 can calculate one or more subflow-level characteristics associated with a flow in the uplink or downlink, (e.g., delay, loss, throughput, etc.). The calculated characteristics can be reported to SDA-c 102.

Using the above mechanisms, the disclosed technology caters to user data flow via subflows assigned to different wireless networks, and makes use of UDP-based logical flow(s) for communication over the logical control path. For ease of deployment and compatibility with multiple underlying wireless networks, exemplary embodiments are directed at Wireless-Spectrum-Access-as-a-Service (WSAaaS). This may be achieved by deploying SDA-c 102 and SDA-g 104 on the World Wide Web, as an application server, e.g., in a cloud infrastructure. If a given wireless network supports IP capability, SDA-c 102 and SDA-g 104 can be accessible by mobile devices 106A, 106B via different wireless networks. Mobile device 106B includes components similar to mobile device 106A as described above.

In many geographical areas, there can be different costs (e.g., in terms of financial cost, ease of deployment, geographical terrain, weather, jurisdictional policies, availability of resources, density of subscribers, or otherwise any other form of cost) associated with one type of wireless network. In these areas, it might be beneficial to have a system composed of different wireless network types rather than a one-size-fits-all approach of a single wireless network covering the entire area. Thus, disclosed embodiments are well-suited in such areas because of its ability to allow different wireless networks to interwork with one another.

FIG. 1 shows SDA-c 102 connected to one or more network servers 132 via logical control paths 128. Non-limiting examples of network servers 132 can be QoS Manager, Profile Manager, Mobility Manager, DHCP, and DNS. QoS Manager server can monitor quality of service (QoS) associated with different network applications (e.g., network applications 132) using SDA system 100. This server can also maintain the minimum expected QoS requirements for different applications and generate alerts or notifications. SDA-c can use the notifications to improve QoS performances. The Profile Manager server can maintain user profiles and provides authentication, authorization, and accounting (AAA) functionalities for users. Although SDA-c 102 is able to provide these functionalities, in some embodiments, external Profile Managers can be used in addition to, or in lieu of, SDA-c 102. Mobility Manager server enables mobility preferences (e.g., hand overs or flow offloading) of users based on capabilities of users' devices. Mobility Manager server can have its own policies and request SDA-c to switch user to one or more networks. DHCP server provides SDA-specific IP addresses to SDA-u programs. DNS server enables SDA-u programs to resolve domain names to IP addresses.

Although FIG. 1 shows mobile devices 106A, 106B communicating via two wireless technologies, i.e., WLAN and LTE, in alternate embodiments, there is no limitation on the number and/or type of underlying networks that can be employed. Examples of wireless technologies include but is not limited to Wifi, LTE, 3G, 4G, 5G, wireless mesh technology, WiMax, or otherwise any type of IP-enabled wireless network technology.

Figure 2:
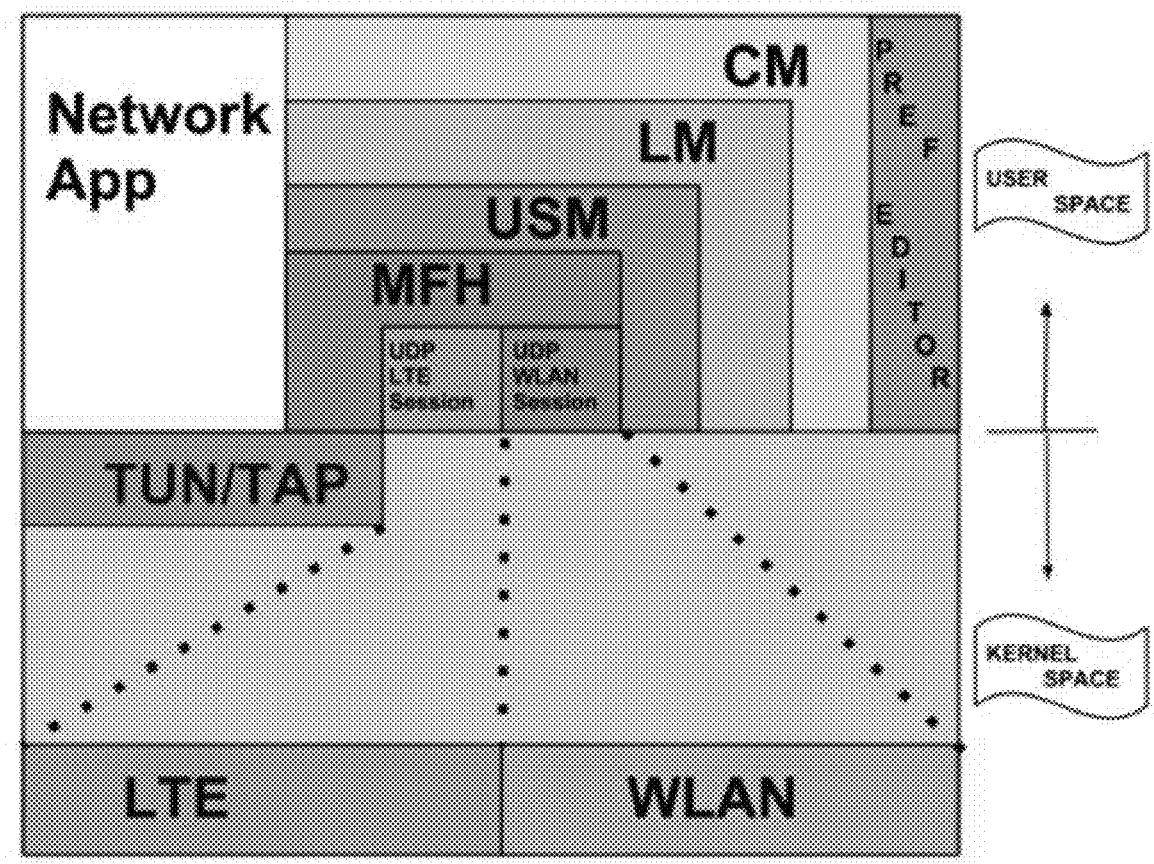
FIG. 2 illustrates a representative SDA-u.

FIG. 2 illustrates a representative SDA-u included in a mobile device. The representative SDA-u includes six (6) modules: TUN/TAP, Multiple Flow Handler (MFH), UDP Session Manager (USM), Link Manager (LM), Preference Editor (PrefEdit), and Client Manager (CM).

TUN/TAP: In some embodiments, Tun/Tap works as a virtual network interface and can be used as a SVNF. For example, Tun/Tap can carry the IP configuration provided by SDA-c. Because the IP configuration typically does not change due to change of local IP address acquired by each interface, it remains valid during handovers from one wireless network to another. Thus, the Tun/Tap interface avoids socket expiration due to change of IP addresses caused by handovers. In some embodiments, the Tun/Tap interface forwards outgoing packets sent by other network applications to the userspace SDA-u. Tun/tap can also deliver packets sent by SDA-u to the respective applications.

Multiple Flow Handler (MFH): In some embodiments, the MFH reads packets forwarded by the Tun/Tap interface for outgoing flows. The MFH can process these packets for different flow specific functions (e.g. encryption, encapsulation, and the like). The MFH forwards the processed flows to different UDP sessions. Typically, the UDP sessions can be bounded to different network interfaces. Since different original flows (from Tun/Tap) are being catered by the UDP flows, MFH can split them into different UDP subflows. In some embodiments, MFH complies to different routing rules provided by SDA-c. MFH can also recover original flows from received packets on different UDP incoming flows. MFH can maintain a frame of fixed IP packets to communication. Upon receiving a frame from a SDA-g and/or other SDA-u programs, MFH associated with a given SDA-u can generate an acknowledgement packet directed to the peer MFH of the SDA-g and/or other SDA-u programs. In some embodiments, MFH introduces a global and a local sequence number to identify subflows catered by different UDP flows. The sequence numbers help MFH to identify losses incurred on wireless links. Upon loss identification, MFH communicates with the peer MFH to recover the stream. In this way, MFH maintains multilink reliable UDP connection(s).

UDP Session Manager (USM): USM maintains and manages different UDP session with intended peers (e.g. SDA-g and other SDA-u programs). USM reestablishes UDP sessions upon link failure or handover.

Link Manager (LM): Link Manager is responsible for establishing wireless links over different networks. It triggers wireless network specific procedures to acquire IP addresses. Once a new set of links are acquired, LM triggers the USM for new UDP sessions. When link losses are identified it requests the USM to close those links. In Linux, LM can be implemented using netlink.

Preference Editor (PrefEdit): This is an user interface for updating wireless link preferences.

Client Manager (CM): The CM takes care of authentication and association with SDA-c. CM and SDA-c communicate over a TCP connection. CM receives link state information from the LM and informs SDA-c about the status. It also reports certain measurement information requested by the SDA-c. Based on the message received from the SDA-c it informs the MFH about the corresponding routing policies.

Figure 3A:
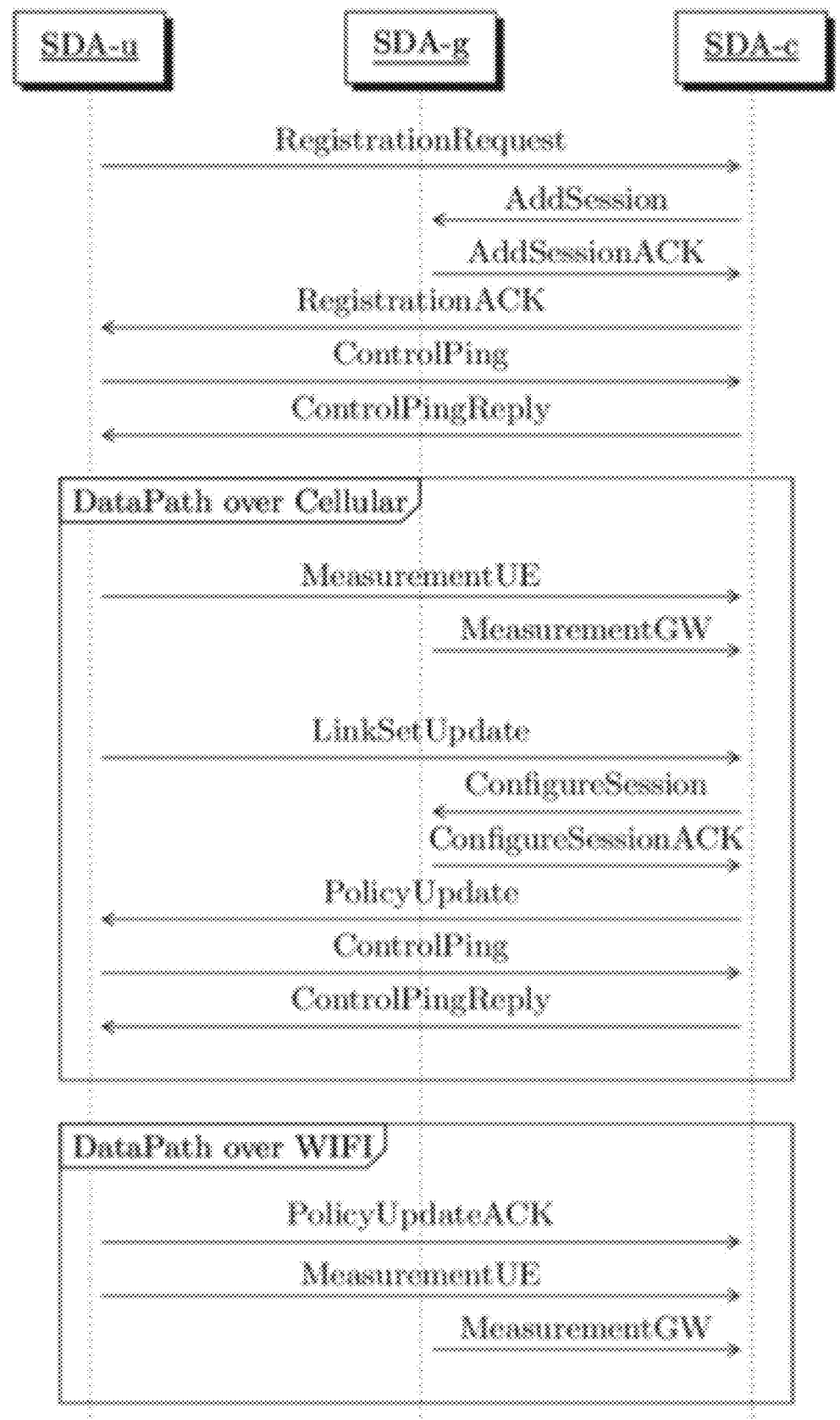
FIG. 3A illustrates a call flow in an exemplary SDA system.

FIG. 3A illustrates a call flow in an exemplary SDA system as described above, for a mobile device with LTE and WiFi capabilities. In the exemplary call flow illustrated in FIG. 3A, LTE is considered as the primary wireless network, although WiFi can be the preferred wireless network for offloading data. Thus, in some embodiments, SDA-u can register and start communication over LTE in the absence of WiFi, but the temporal availability of WiFi can trigger data offload from LTE to Wifi.

As shown in FIG. 3A, SDA-u sends a RegistrationRequest to SDA-c using a TCP connection over LTE. This request can include identity and authentication data as well as user preferences. SDA-c uses the identity and authentication data to authenticate and identify an appropriate QoS level for SDA-u. SDA-c also opens a control UDP socket for a logical control path. To configure the data path, SDA-c sends an AddSession message to SDA-g. This message includes ConfigureSession, which provides configuration for the data path and logical control path as well as measurement and reporting. SDA-c may configure SDA-g for periodic and event-based reporting. ConfigureSession can also embed a PolicyUpdate message to configure the transmission policy. The transmission policy can enable SDA-g and/or SDA-u to schedule packets among different wireless networks. SDA embodiments support a wide variety of policies (e.g., routing, bandwidth aggregation, offloading, etc.) SDA-g and/or SDA-u can configure the data path and logical control path according to these policies and responds back to SDA-c with an AddSessionACK message. AddSessionACK acknowledges successful configuration as well as the SDA-g logical control path. After this, SDA-c sends a RegistrationACK message to SDA-u. This message confirms successful registration. RegistrationACK also includes ConfigureSession, which includes configurations for control, data path and measurement sessions. It also conveys embedded PolicyUpdate message specifying a transmission policy.

After successful registration, SDA-u sends ControlPing over UDP using default interface to SDA-c. SDA-c learns the public IP address of SDA-u for the control path and acknowledges by sending ControlPingReply. Finally, SDA-u terminates the TCP session with SDA-c. In the call flow of FIG. 3A, the mobile device is initially assumed to be out of WiFi coverage. Therefore, SDA-c configures the data path and the logical control path over LTE. After this, the user data is carried over LTE. During this period, both SDA-u and SDA-g periodically update SDA-c about the data path and wireless link parameters through measurement reports.

When WiFi becomes available, SDA-u sends LinkSetUpdate message to SDA-c with WiFi network information over the logical control path. SDA-c evaluates the optimal data path and QoS for the mobile device. Since WiFi is the preferred network, SDA-c selects WiFi as the next data path. SDA-c updates SDA-g about the new data path by sending a ConfigureSession message. SDA-g responds with ConfigureSessionAck to SDA-c, indicating the completion of configuration. Then SDA-c sends a PolicyUpdate message to SDA-u with an updated transmission policy. Since the mobile device can be behind NAT, the public address of the mobile device is updated via WiFi at the SDA-c by restarting the control path handshake. The same process may be used to configure different paths over the preferred wireless networks. All the user data is now transmitted via WiFi instead of LTE.

Although the above call flow example shows a typical offloading scenario, SDA-c can also select different policies, such as aggregation. A PolicyUpdate message can be used to configure the data path accordingly. Moreover, SDA-c can dynamically adapt the transmission policy based upon measurement reports from SDA-g and SDA-u.

Although the above example shows a typical offloading scenario, SDA-c can also select different policies, e.g., a bandwidth aggregation policy. A bandwidth aggregation policy can be used to divide the user data among different wireless networks. For example, a bandwidth aggregation policy can be utilized to segment data (e.g., on a data path)

so that non-overlapping portions of the data can be transmitted via different wireless networks.

FIG. 3B illustrates an exemplary bandwidth aggregation process that can be used in embodiments of the disclosed SDA system. In embodiments involving multiple wireless links (or, alternatively networks), bandwidth aggregation can be based on a weighted round robin scheduling scheme. Using this scheme, the weights for a given link can be adapted to the throughput of that link. Due to mobility and/or fluctuating network conditions, these weights can be adapted dynamically. The exemplary embodiments consider the wireless links as queues and service rates as their throughputs.

Maintaining a non-zero queue length for a wireless link may result in saturating the link, resulting in bandwidth aggregation from multiple links. The exemplary embodiments use a mix of two scheduling mechanisms, i.e., a weighted round robin mechanism and a non-zero queue length mechanism. The exemplary embodiments use weighted round robin scheduling if all queues are less than a threshold value Lthresh. In some embodiments, weights can be initialized to unity or assigned predefined values provided by SDA-c. If some wireless links have queue lengths more than Lthresh and less than Uthresh, the scheduler selects a wireless link with a minimum queue length. If all queue lengths are higher than Lthresh, the scheduler performs weighted round robin scheduling with the weight being determined based on the service rate of the queue. In some embodiments, the queue length may be measured as the sum of the socket buffer queue and the unacknowledged bytes on each link. In some embodiments, the weights for a given link can be based on the service rate which is indicative of a rate at which the length of a queue decreases over time, not including instances when the queue length is equal to or approaches zero.

Figure 4:
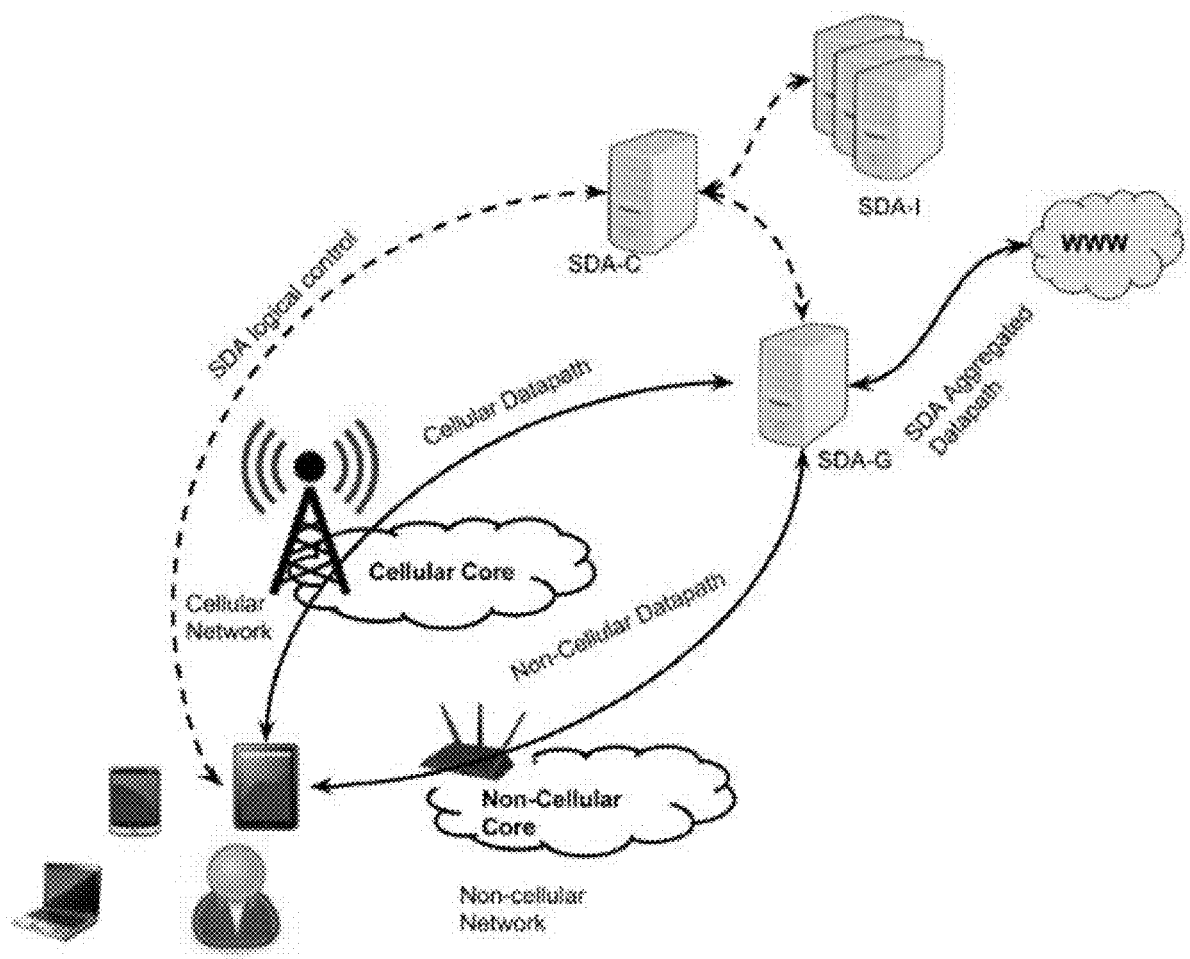
FIG. 4 illustrates an exemplary embodiment of a representative SDA controller ("SDA-c") with an artificial intelligence engine.

FIG. 4 illustrates an exemplary embodiment of a representative SDA controller ("SDA-c") integrated with an artificial intelligence software engine, SDA-i. In some embodiments, SDA-i collects (i) using logical control path, various measurement reports/characteristics of data paths (e.g., associated with cellular networks and non-cellular networks shown in FIG. 4) from SDA-g and/or SDA-u programs and (ii) policies from SDA-c to create a dataset. Using the reports and policies, SDA-i can employ different methodologies to determine network behavior (e.g., detect anomalies) in the underlying wireless network.

As an example, SDA-i can implement the following functions: a) processing data points in the collected measurement reports/characteristics by removing erroneous, ambiguous and invalid data; b) identifying long and short term variations in the dataset; c) correlating more than one data set to identify their interdependence or pattern identification; and d) predicting and notifying events configured by the SDA-c. In some embodiments, a SDA-c can include more than one SDA-i program for analyzing different types of datasets. Non-limiting examples of different types of datasets can be: 1) radio/driver events and logs; 2) IP/TCP/UDP logs and events; 3) user equipment or user profile data; 4) sensory information (e.g., location, temperature, pollution, vibration, and device health); 5) application and service demand; and 6) social and web activities.

In some embodiments, SDA-i can generate alerts/notifications related to the health of the data path(s) and logical control path, as shown in FIG. 4. SDA-i can also generate alerts/notifications related to the reliability of the underlying wireless network and/or availability of services. The alerts/notifications can be based upon one or more policies (e.g., bandwidth aggregation and offloading) enforced by SDA-c. SDA-c can configure various thresholds for generating alert notifications by the SDA-i. SDA-c can use these alerts and notifications to update and optimize its policies in near real time. Although FIG. 4 shows SDA-i as being coupled to SDA-c, in some embodiments, SDA-i can be included within SDA-c.

Figure 5:
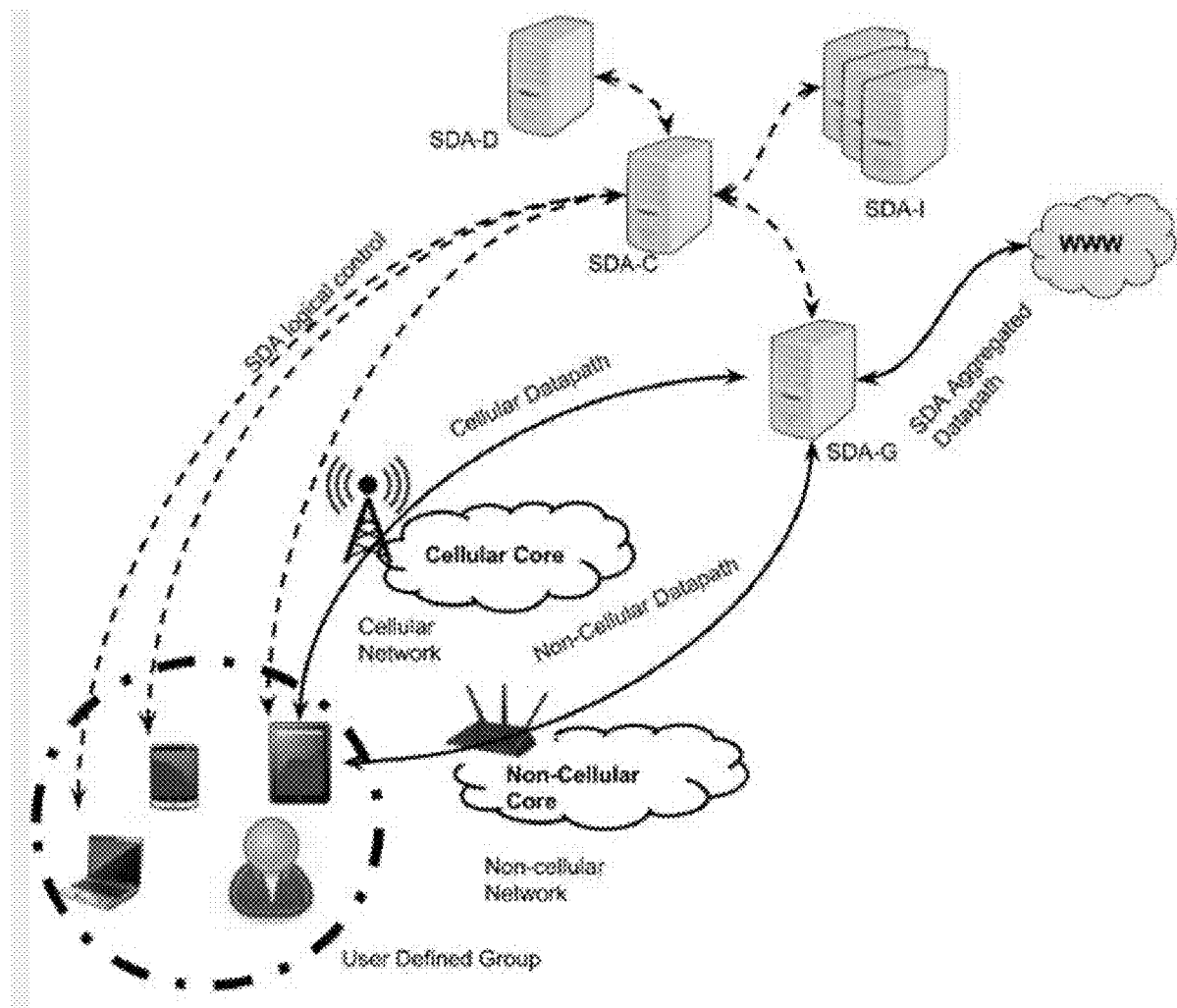
FIG. 5 illustrates an exemplary embodiment of a representative SDA controller configured for maintaining application context across multiple devices.

FIG. 5 presents an architectural overview of a context resolution engine ("SDA-d") integrated with a SDA-c. In some embodiments, the disclosed logical control path provides the ability for SDA-c to "group" or otherwise, represent multiple electronic/mobile devices as a "single logical unit." There can be several advantages associated with representing multiple electronic/mobile devices as a single abstract/logical unit. For example, the abstract unit (e.g., implemented in software) can provide better situational awareness (e.g., a cop operating multiple electronic devices such as a laptop, a wireless body camera, and a two-way walkie-talkie), reduce the burden of measurements and log collections, improve accuracy of various measurements, and provide improved analysis of user behavior. Additionally, the abstract unit can also be used to identify a source as well as a destination of contents, and destination of services. For example, a user can use an app (associated with a SDA-u program) on his or her mobile phone to play video content on a different device such as a tablet computer or redirect content from the tablet computer to the mobile phone. In accordance with embodiments disclosed herein, the mobile phone and the tablet computer can be identified as an abstract unit. In some embodiments, the user specifies the devices to be grouped as an abstract unit.

FIG. 5 presents an architectural overview of a context resolution engine ("SDA-d") integrated with a SDA-c. The SDA-d provides the functionality to represent a group of devices (e.g., the mobile phone and the tablet computer in the above example) as an abstract unit. Based on information related to a device's context received via the logical control channel, SDA-d can maintain unique contexts across multiple devices and it enables an SDA-c to identify optimal devices or resources, for certain types of services and/or wireless networks. For example, based on the context associated with a mobile device, a given mobile device can be better-suited for one type of wireless network compared to another mobile device. As another example, a given mobile device can be better-suited for a specific service compared to another mobile device. Non-limiting examples of a context can be a type (hardware/software configuration) of a mobile device, a time of operation, a location of the mobile device, specifications of the service requested by the mobile device, a signal strength on the uplink/downlink for one or more wireless networks accessible by the mobile device, or otherwise any suitable context surrounding the mobile device. In some embodiments, a device can be a member of more than one group.

An SDA-c that includes a SDA-d can allow the end user to combine a group of devices as a logical unit. To identify a unique group, in some embodiments, SDA-d can maintain a group profile with unique user id (UUID) based for each group of devices along with the constituent group elements/members. The group profile can be based on capabilities of each member device and the preferences configured by the user or an administrator. Although FIG. 5 shows SDA-d as being coupled to SDA-c, in some embodiments, SDA-d can be included within SDA-c.

Various exemplary modes of operation of a SDA system in the context of Wireless Spectrum Access-as-a-Service (WSAaaS) are described next in greater detail.

User Requested WSAaaS

Figure 6:
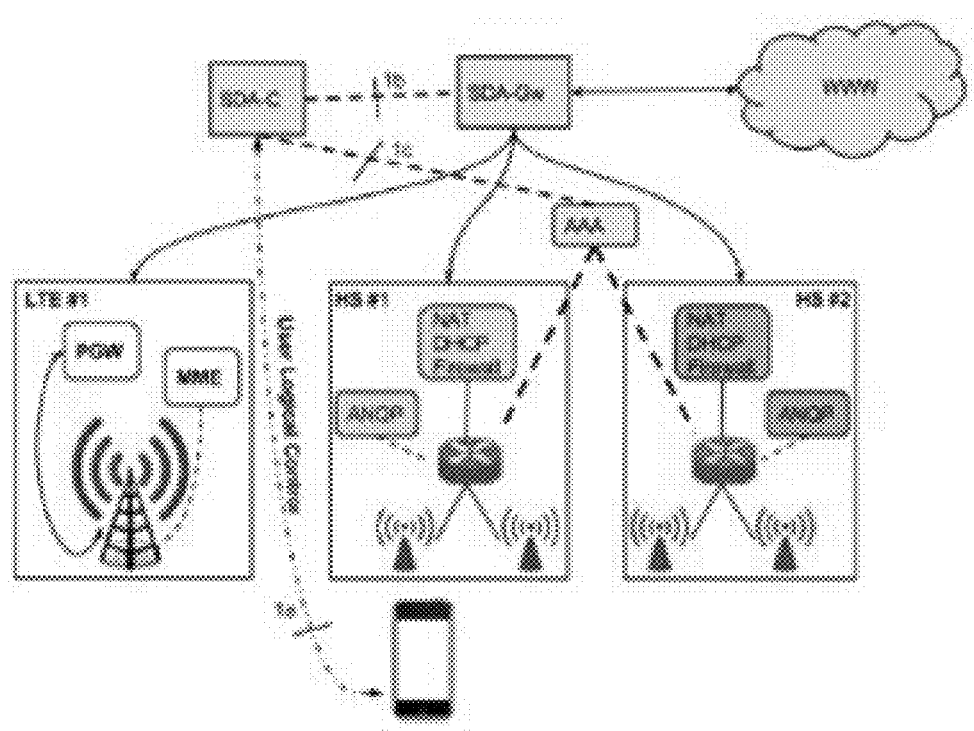
FIG. 6 illustrates an exemplary embodiment of a representative SDA controller configured for enabling user equipment (UE)-initiated spectrum access functionality.

FIG. 6 illustrates an exemplary embodiment of a representative SDA controller configured for enabling user equipment (UE)-initiated spectrum access functionality. In this embodiment, SDA controller (SDA-c) interfaces with Authentication, Authorization and Accounting server (AAA) of WLAN networks (e.g., interface 1c in FIG. 6 for interfacing with wireless network Hot Spot #1 and wireless network Hot Spot #2). In some embodiments, the AAA server can be a part of the SDA system or it can be separate from the SDA system. In some embodiments, interface 1c includes a wired network connection. The embodiment shown in FIG. 6 is directed at a scenario where the AAA server can allow a mobile device to switch from a cellular LTE network to one of the two hotspots.

SDA-c can maintain user profiles with different service level agreements (SLA), user preferences and subscriptions information. SDA-c can assess the quality of experience (QoE) of users through measurement reports received via the logical control path. SDA-c can use interface 1c to configure AAA servers and add, edit or remove access to one of the hot spots by SDA-u client programs running on the mobile device. In this scenario, the mobile device (e.g., an SDA-u app on the mobile device) can send a ReconfigurationRequest-UE request to SDA-c with information about the available networks and expected QoE levels via logical control path 1a. As a result, SDA-c can utilize the information to evaluate different WLANs and select the most suitable WLAN. SDA-c can also use interface 1c to configure AAA of selected WLAN to provide a SDA-u with QoE levels requested by the SDA-u. Finally, SDA-c can respond to SDA-u with ReconfigurationRequestResponse-UE message including different wireless access network parameters/configurational settings for the SDA-u to access selected WLAN.

Network Requested WSAaaS

Figure 7:
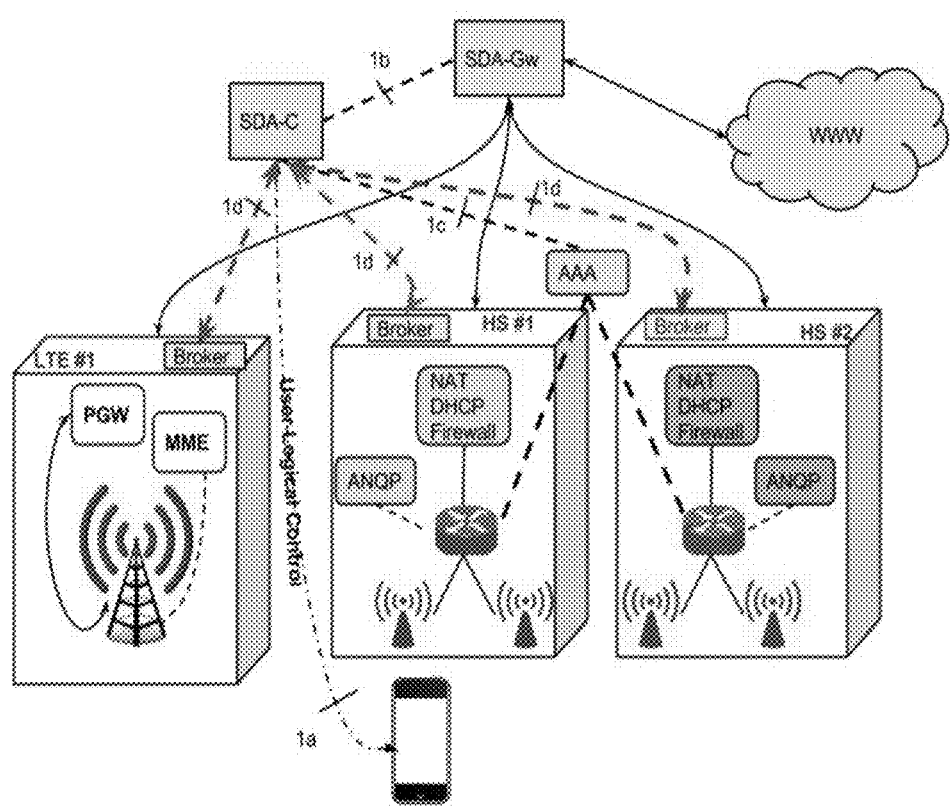
FIG. 7 illustrates an exemplary embodiment of a representative SDA controller configured for enabling network-initiated spectrum access functionality.

FIG. 7 shows the network-requested mode of WSAaaS. In some embodiments, this mode of operation may co-exist with the UE-initiated spectrum access mode. In this mode, each network (e.g., LTE #1, Hot Spot #1, and Hot Spot #2) can include network brokers that negotiate spectrum access with the SDA-c. The brokers can monitor resources of their respective networks and inform SDA-c to request more SDA-u programs or flows. They can also request to offload them to some other network, e.g., due to network congestion. To enable communication between these network brokers and SDA-c use interface 1d (e.g., a wired network connection). In this mode, when a network observes heavy traffic load and congestion, it can send ReconfigurationRequest-NW message to SDA-c over the 1d interface. SDA-c can use the information collected from SDA-u programs associated with a network to identify and select appropriate alternate networks. SDA-c can configure the AAA server over 1c interface to provision accesses to the SDA-u programs. SDA-c can also send ReconfigurationInstruction-UE to SDA-u programs requesting them to switch to the newly provisioned network. Finally, SDA-c can notify the network broker via the ReconfigurationResponse-NW message. Apart from requesting to offload flows and SDA-u programs from the network, a network broker can also send ResourceStatus-NW to report the status of network resources with an intent to request more flows and SDA-u programs. This mode of operation introduces competition among networks and operators to provide better services. In a competitive network deployment, the brokers may optionally provide some non-network or monetary incentive to get preference from the SDA-c. The SDA-c can select an optimal set of networks to provide access to SDA-u programs.

Application/Service Requested WSAaaS

Figure 8:
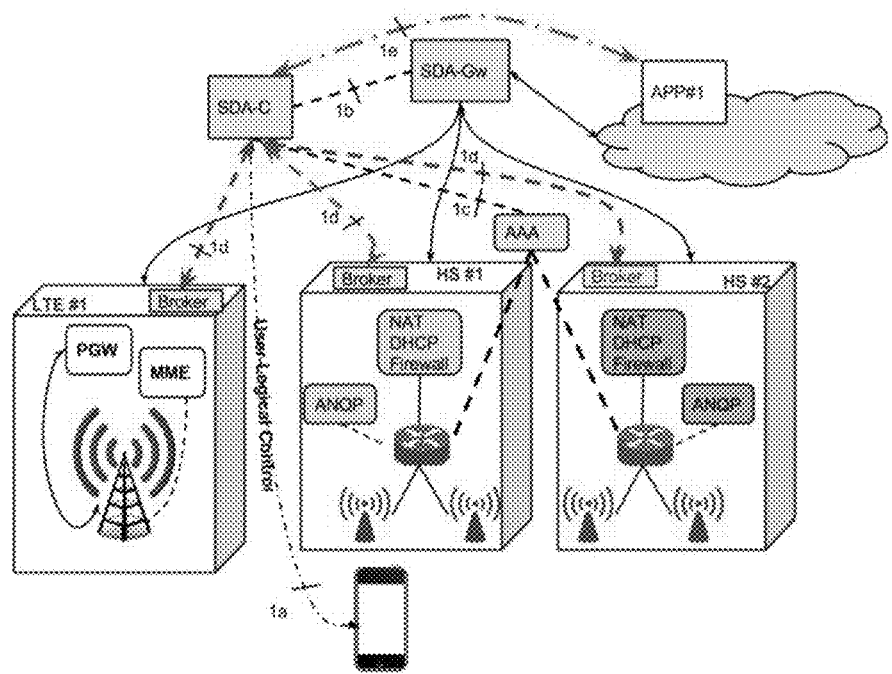
FIG. 8 illustrates an exemplary embodiment of a representative SDA controller configured for enabling application-initiated spectrum access functionality.

FIG. 8 shows the Application or service requested mode of WSAaaS. This mode of operation may co-exist with the modes previously described herein. In this mode, the application server and the services with expected minimum quality of service (QoS) requirement can register with the SDA-c. Application Server and SDA-c can implement interface 1e for control path transactions. Based upon the advertised capacity from the network brokers, network conditions, user preferences, explicit user request and network offload requests, SDA-c can assess the overall system state. In this mode, an application server can send ReconfigurationRequest-APP message to SDA-c indicating degrading QoS level for services associated with specific SDA-u programs. SDA-c can negotiate additional resources with the network brokers associated with the SDA-u programs by sending ReconfigurationInstruction-NW. If the related network brokers are able to allocate additional resources, SDA-c can be notified with result code "Success" in ReconfigurationInstructionResponse-NW message. If some of those network brokers are unable to allocate additional resources, result code can be "Failure." Upon failure, SDA-c can identify one more new networks to offload some of the traffic and inform the associated broker(s) with ReconfigurationInstruction-NW. After successful configuration of the new network(s), SDA-c can notify SDA-u programs to move to a newly configured network. Finally, SDA-c can inform the status of the reconfiguration request to application server by sending a ReconfigurationResponse-APP message.

Third Party Requested WSAaaS

Figure 9:
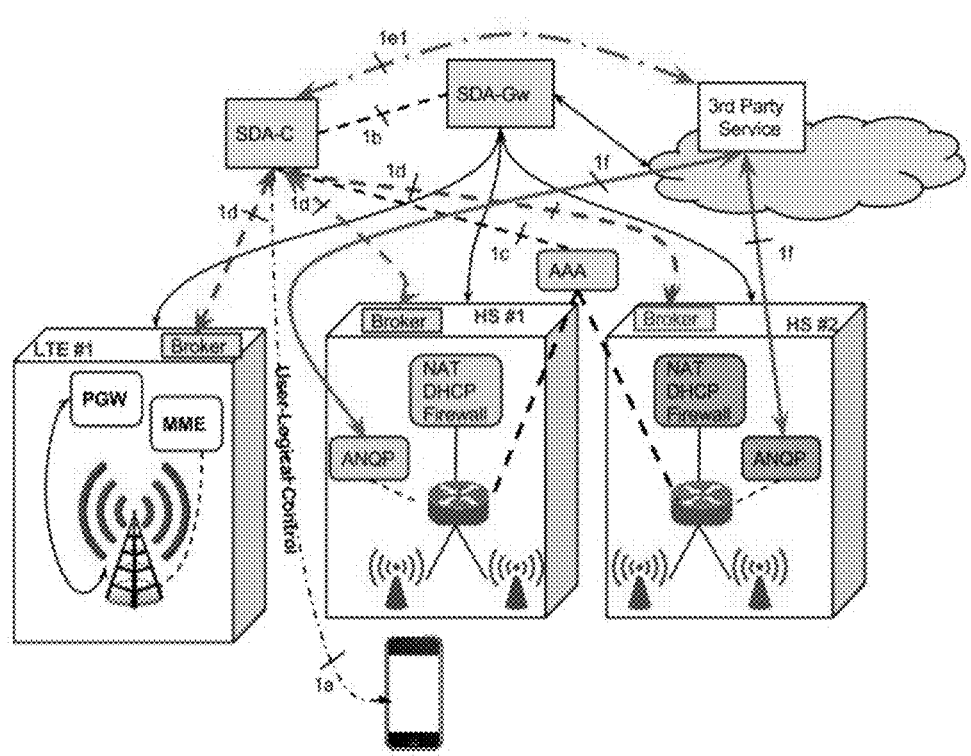
FIG. 9 illustrates an exemplary embodiment of a representative SDA controller configured for enabling third party application server-initiated spectrum access functionality.

FIG. 9 shows a 3rd party application or service requested mode of Spectrum Access-as-a-Service (WSAaaS). This mode of operation may co-exist with the modes previously discussed herein. However, in some embodiments, unlike the previous mode discussed in connection with FIG. 8, the application negotiating resources for SDA-u programs typically does not host network services (i.e., video, www, data). This 3rd party application can be associated with Mobile Virtual Network Operators (MVNO) for commercializing spectrum access as a service. For example, a local business may not be able to advertise their products or services to users who do not access their wireless network. Therefore, to encourage fair competition, this embodiment includes interface 1f between access network query protocol (ANQP) and the application server. This interface (bidirectional) allows a wireless network infrastructure provider or the local business to present advertisements to a remote subscriber. The local business can also offer network and non-network related incentives. These incentives can include spectrum or web access. This mode can also facilitate third party applications to offer additional spectrum access. Procedures in this mode of operation can be similar to Application/Service Requested WSAaaS and triggered by a 3rd party application by sending ReconfigurationRequest-APP to SDA-c.

WSAaaS with Identity as a Service (IaaS)

Figure 10:
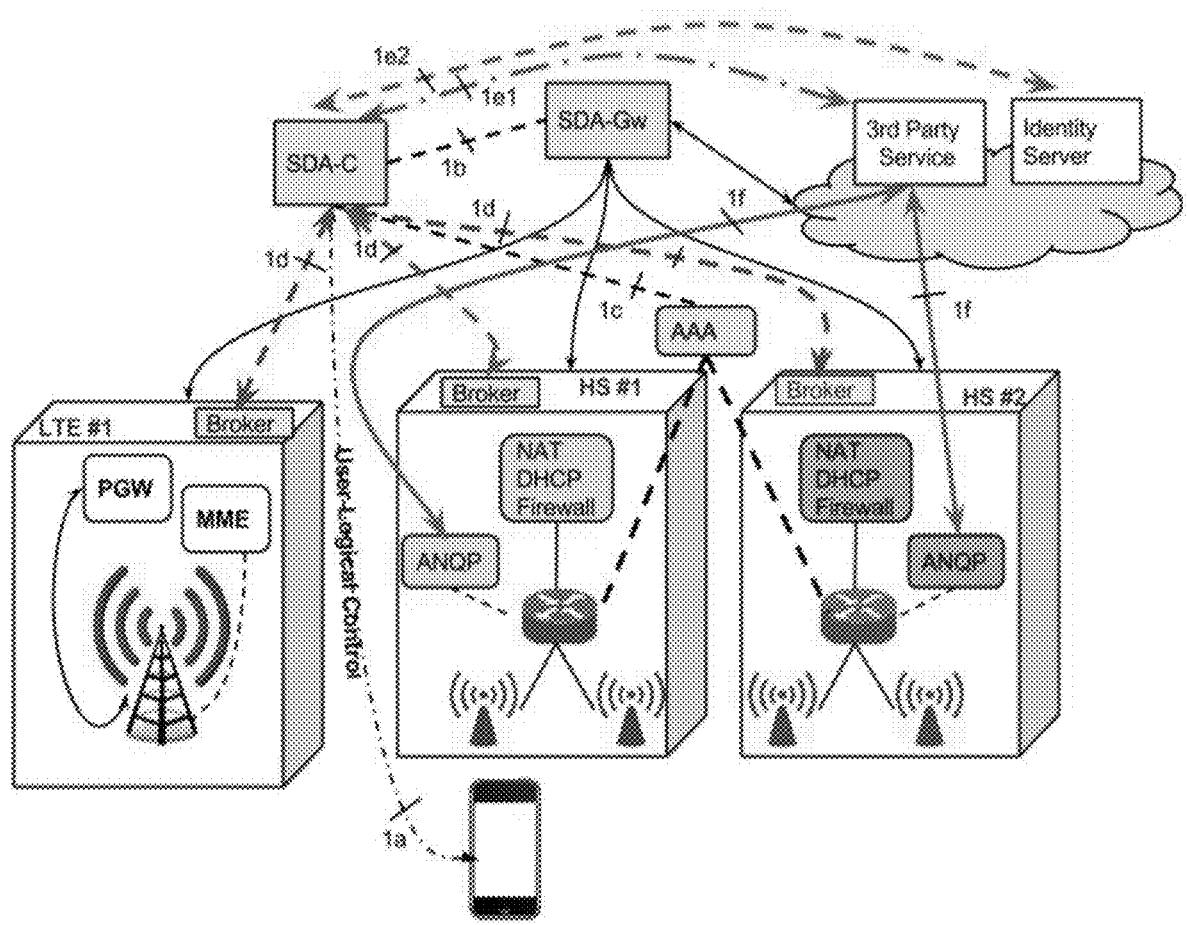
FIG. 10 illustrates an exemplary embodiment of a representative SDA controller configured for enabling user devices having subscriber identity modules (SIM) with spectrum access functionality.

FIG. 10 shows a WSAaaS to provide IaSS functionality. Various MVNO (Mobile Virtual Network Operators) and Internet of Things (IoT) platforms are adopting soft international mobile subscriber identity (IMSI) and embedded SIM (eSim) to provide cellular connectivity across the world. These eSIM cards or IMSIs allow user equipment to acquire unique secured identity from multiple network operators. Therefore, switching network operators or connecting to another operator in different countries is possible without replacing the SIM module. Relevant Identities stored in the UE or the SIM module are delivered over the air (OTA) for connecting to a new operator. These technologies can cater to on-demand identities as a service or Identity-as-a-Service (IaaS). FIG. 10 considers this scenario where identities as served by an Identity Server adopting the IaaS model. FIG. 10 shows interface 1e2 connecting SDA-c with the identity server. This interface along with the logical control path puts SDA-c in between the UE and the identity server. In this scenario, SDA-c can assist UE to acquire relevant identities over the air via operator agnostic logical control path. Moreover, SDA-c can use information from UEs and network operators acquired over previously discussed interfaces to better negotiate access and ensure mobility of devices with Soft SIM or eSIM cards.

WSAaaS with Local Server and IaaS

Figure 11:
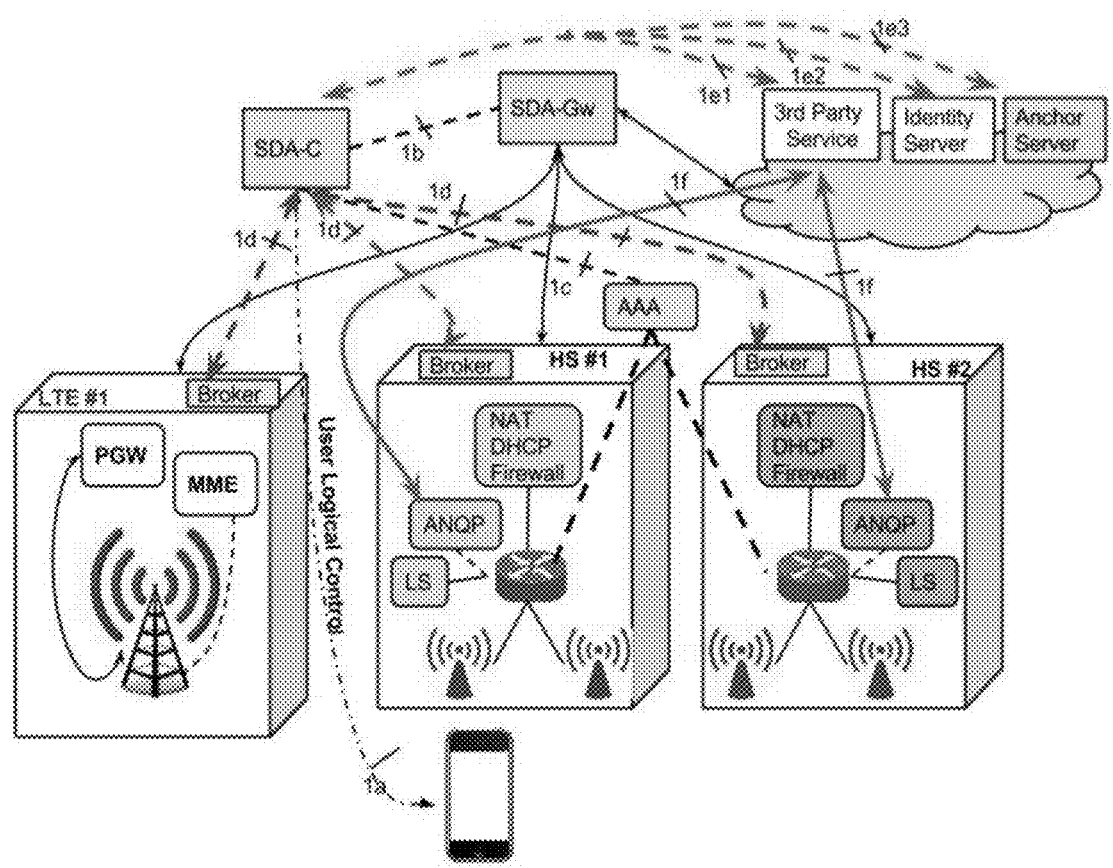
FIG. 11 illustrates an exemplary embodiment of a representative SDA controller configured for enabling local businesses with spectrum access functionality.

FIG. 11 illustrates an exemplary embodiment of a representative SDA controller configured for enabling businesses with spectrum access functionality. Businesses (e.g., hotel, restaurants, cafeteria) typically provide Internet access to customers. In some embodiments, a local business can utilize the functionality of Internet access to host additional web content over their network. This content may not be visible or accessible outside the local business's network. Those embodiments include an anchor server (AS). AS server can enable accessing the additional web content/services hosted by local business on their network, e.g., on a local server (LS) of the business. AS also allows local content on LS to contend and negotiate network access similar to other applications as discussed in connection with FIG. 8. In this scenario, the disclosed system includes a new interface 1e3 between AS and SDA-c. It allows a local business to host content that can be accessed by users through WSAaaS outside their network.

Although different exemplary modes of operation in the context of WSAaaS, are illustrated, in some embodiments, a combination of these modes can coexist. Such a hybrid WSAaaS can allow users, service provider networks, and services to optimally utilize the spectrum optimally. In addition to optimally utilizing the spectrum, in some spectrum access sharing embodiments, infrastructure owner or local businesses can participate in Dynamic spectrum access (DSA). For example, WSAaaS can allow access network or infrastructure owner (i.e. local businesses) to advertise beyond their wireless access limits using third party applications/service. These third party applications can be used to advertise non-network incentive as well (e.g. Plenty/reward point, coffee). In this way, WSAaaS can help local businesses to attract customers. On the other hand, the third party applications may want to use Hotspot2.0 to advertise to a specific customer segment (e.g. who drinks coffee, or eats in Mexican restaurants etc.), providing spectrum access as a service. Third Party applications can also allow wireless infrastructure owner to "sell" or "buy" spectrum access through their network infrastructure. Moreover, WSAaaS can involve local business to build infrastructure for WiFi networks.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. Also, many of the software modules can be provided as widgets to end users. The connectivity between the modules and/or components within the modules may be provided using any one of the connectivity methods and media that is known in the art, including, but not limited to, communications over the Internet, wired, or wireless networks using the appropriate protocols.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

The invention claimed is:

1. A system for facilitating interoperability between a first wireless network and a second wireless network accessible by a plurality of mobile devices comprising:
a central controller operating on a software defined architecture for negotiating accesses to wireless spectrum associated with the first wireless network and the second wireless network by the plurality of mobile devices, the central controller configured for:
receiving end-to-end measurements and user preferences from at least one mobile device in the plurality of mobile devices connected to the first wireless network and the second wireless network, wherein the end-to-end measurements at least include (i) network-centric measurements associated with the first wireless network and the second wireless network, (ii) device-centric measurements specific to the at least one mobile device, and (iii) application-centric measurements specific to one or more applications running on the at least one mobile device;

determining a set of policies applicable to the at least one mobile device based on optimizing the network-centric measurements, the device-centric measurements, and the application-centric measurements;

communicating the set of policies to the at least one mobile device, wherein the set of policies indicate offloading the at least one mobile device from the first wireless network to the second wireless network in response to an event associated with the first wireless network; and upon detecting termination of the event, communicating a new policy to the at least one mobile device for reverse offloading connectivity of the at least one mobile device such that the at least one mobile is connected back to the first wireless network from the second wireless network;

a logical control path connecting the central controller to the at least one mobile device for communicating the end-to-end measurements and the user preferences of the at least one mobile device, the logical control path agnostic to the first wireless network, the second wireless network, the at least one mobile device, and the one or more applications running on the at least one mobile device; and at least one local client application included in the one or more applications running on the at least one mobile device configured for implementing the set of policies or the new policy at the at least one mobile device, and wherein the first wireless network is included as part of a licensed spectrum band and the second wireless network is included as part of an unlicensed spectrum band or vice-versa.

2. The system of claim 1, wherein the central controller is further configured for: upon detecting that the first wireless network and the second wireless network are amenable to compete for connectivity with the at least one mobile device, negotiating allocations of spectrum access resources between the first wireless network and the second wireless network.

3. The system of claim 1, wherein the logical control path is a dedicated path supplemental to a path for exchanging data traffic.

4. The system of claim 1, wherein an internet protocol (IP) address of the at least one mobile device remains unchanged regardless of transitions between the first wireless network to the second wireless network.

5. The system of claim 1, further comprising: a gateway server for calculating sub-flow level characteristics associated with a flow in uplink communication or downlink communication between the central controller and the at least one mobile device.

6. The system of claim 5, wherein the central controller is further configured for: adding or removing sub-flows on data paths connecting the gateway server and the at least one mobile device.

7. A central controller-implemented method for facilitating interoperability between a first wireless network and a second wireless network accessible by a plurality of mobile devices comprising:

receiving end-to-end measurements and user preferences from at least one mobile device in the plurality of mobile devices connected to the first wireless network and the second wireless network, wherein the end-to-end measurements at least include (i) network-centric measurements associated with the first wireless network and the second wireless network, (ii) device-centric measurements specific to the at least one mobile device, and (iii) application-centric measurements specific to one or more applications running on the at least one mobile device;

determining a set of policies applicable to the at least one mobile device based on optimizing the network-centric measurements, the device-centric measurements, and the application-centric measurements;

communicating the set of policies to the at least one mobile device, wherein the set of policies indicate offloading the at least one mobile device from the first wireless network to the second wireless network in response to an event associated with the first wireless network; and upon detecting termination of the event, communicating a new policy to the at least one mobile device for reverse offloading connectivity of the at least one mobile device such that the at least one mobile is connected back to the first wireless network from the second wireless network, wherein a logical control path connects the central controller to the at least one mobile device for communicating the end-to-end measurements and the user preferences of the at least one mobile device, wherein the logical control path is agnostic to the first wireless network, the second wireless network, the at least one mobile device, and the one or more applications running on the at least one mobile device, and wherein the first wireless network is included as part of a licensed spectrum band and the second wireless network is included as part of an unlicensed spectrum band or vice-versa.

8. The central controller-implemented method of claim 7, further comprising: upon detecting that the first wireless network and the second wireless network are amenable to compete for connectivity with the at least one mobile device, negotiating allocations of spectrum access resources between the first wireless network and the second wireless network.

9. The central controller-implemented method of claim 7, wherein the logical control path is a dedicated path supplemental to a path for exchanging data traffic.

10. The central controller-implemented method of claim 7, wherein an internet protocol (IP) address of the at least one mobile device remains unchanged regardless of transitions between the first wireless network to the second wireless network.

11. The central controller-implemented method of claim 7, wherein a gateway server calculates sub-flow level characteristics associated with a flow in uplink communication or downlink communication between the central controller and the at least one mobile device.

12. The central controller-implemented method of claim 11, further comprising: adding or removing sub-flows on data paths connecting the gateway server and the at least one mobile device.

13. A non-transitory computer-readable storage medium having stored thereon instructions which, when executed by a processor of a central controller electronic device, cause the processor to:

receive end-to-end measurements and user preferences from at least one mobile device in the plurality of mobile devices connected to the first wireless network and the second wireless network, wherein the end-toend measurements at least include (i) network-centric measurements associated with the first wireless network and the second wireless network, (ii) device-centric measurements specific to the at least one mobile device, and (iii) application-centric measurements specific to one or more applications running on the at least one mobile device;

determine a set of policies applicable to the at least one mobile device based on optimizing the network-centric measurements, the device-centric measurements, and the application-centric measurements;

communicate the set of policies to the at least one mobile device, wherein the set of policies indicate offloading the at least one mobile device from the first wireless network to the second wireless network in response to an event associated with the first wireless network; and upon detecting termination of the event, communicate a new policy to the at least one mobile device for reverse offloading connectivity of the at least one mobile device such that the at least one mobile is connected back to the first wireless network from the second wireless network, wherein a logical control path connects the central controller to the at least one mobile device for communicating the end-to-end measurements and the user preferences of the at least one mobile device, wherein the logical control path is agnostic to the first wireless network, the second wireless network, the at least one mobile device, and the one or more applications running on the at least one mobile device, and wherein the first wireless network is included as part of a licensed spectrum band and the second wireless network is included as part of an unlicensed spectrum band or vice-versa.

14. The non-transitory machine-readable storage medium of claim 13, wherein the instructions further cause the processor to: upon detecting that the first wireless network and the second wireless network are amenable to compete for connectivity with the at least one mobile device, negotiate allocations of spectrum access resources between the first wireless network and the second wireless network.

15. The non-transitory machine-readable storage medium of claim 13, wherein the logical control path is a dedicated path supplemental to a path for exchanging data traffic.

16. The non-transitory machine-readable storage medium of claim 13, wherein an internet protocol (IP) address of the at least one mobile device remains unchanged regardless of transitions between the first wireless network to the second wireless network.

17. The non-transitory machine-readable storage medium of claim 13, wherein a gateway server calculates sub-flow level characteristics associated with a flow in uplink communication or downlink communication between the central controller and the at least one mobile device.

18. The non-transitory machine-readable storage medium of claim 17, wherein the instructions further cause the processor to: adding or removing sub-flows on data paths connecting the gateway server and the at least one mobile device.

* * * * *